(12) United States Patent
Fouquet et al.

(10) Patent No.: US 7,852,645 B2
(45) Date of Patent: Dec. 14, 2010

(54) CIRCUIT AND ASSOCIATED METHOD FOR REDUCING POWER CONSUMPTION IN A POWER TRANSFORMER

(75) Inventors: Julie Fouquet, Portola Valley, CA (US); Richard Lum, Singapore (SG); Richard Baumgartner, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 357 days.

(21) Appl. No.: 11/954,498

(22) Filed: Dec. 12, 2007

(65) Prior Publication Data

US 2009/0154206 A1 Jun. 18, 2009

(51) Int. Cl.
H02M 7/04 (2006.01)
H02J 3/14 (2006.01)

(52) U.S. Cl. .......................... 363/81; 363/84; 323/284; 307/39

(58) Field of Classification Search .................. 361/18; 363/53, 84, 89, 125, 127, 81; 307/39; 323/284
See application file for complete search history.

(56) References Cited

U.S. PATENT DOCUMENTS

| | | | |
|---|---|---|---|
| 4,975,592 A | 12/1990 | Hahn et al. | |
| 5,565,714 A * | 10/1996 | Cunningham | 307/112 |
| 5,936,620 A | 8/1999 | Komine et al. | |
| 6,104,622 A | 8/2000 | Shin | |
| 6,496,390 B2 | 12/2002 | Yang | |
| 6,754,092 B2 * | 6/2004 | McDowell et al. | 363/89 |
| 7,248,485 B2 * | 7/2007 | Hermann et al. | 363/20 |
| 7,286,376 B2 | 10/2007 | Yang | |
| 7,315,097 B2 * | 1/2008 | Tajika | 307/131 |
| 7,411,317 B2 * | 8/2008 | Liu | 307/112 |
| 2002/0163371 A1 | 11/2002 | Hall et al. | |
| 2003/0214819 A1 | 11/2003 | Nakagawa | |
| 2006/0055433 A1 | 3/2006 | Yang et al. | |
| 2006/0083038 A1 * | 4/2006 | Lynch | 363/127 |
| 2007/0047270 A1 * | 3/2007 | Makino et al. | 363/34 |
| 2007/0202932 A1 | 8/2007 | Keller | |
| 2008/0130340 A1 * | 6/2008 | Unger et al. | 363/146 |
| 2008/0239593 A1 * | 10/2008 | Lavier et al. | 361/18 |

* cited by examiner

*Primary Examiner*—Jeffrey L Sterrett
*Assistant Examiner*—Fred E Finch, III

(57) ABSTRACT

A method and circuit is provided for reducing power consumption in a power transformer, typically incorporated into an electrical or electronic device such as a consumer device. In an embodiment, a detection/isolation circuit is coupled to an input of a power transformer/rectifier via a switching device. The switching device can be, for example, a solid state relay. The detection/isolation circuit is configured to sense the occurrence of no-load conditions in the power transformer and responsively disengage the power transformer from a coupled source of power (e.g., wall outlet) via the coupled switching device.

14 Claims, 3 Drawing Sheets

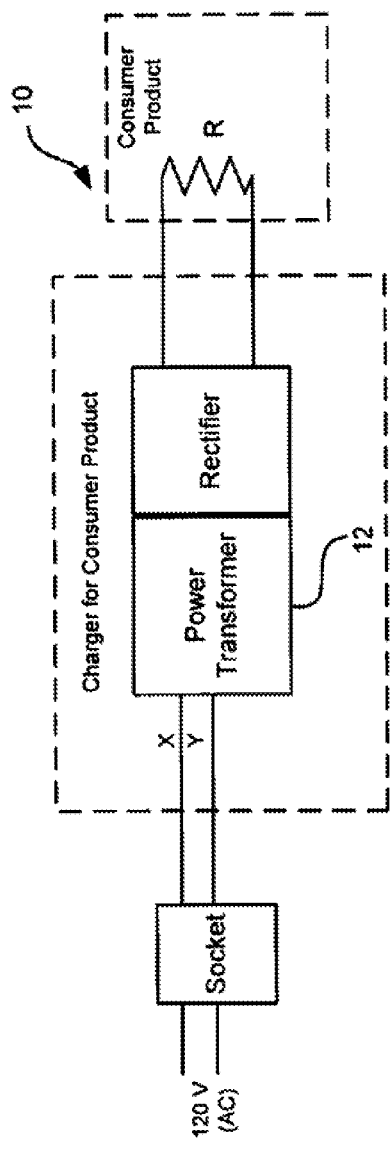
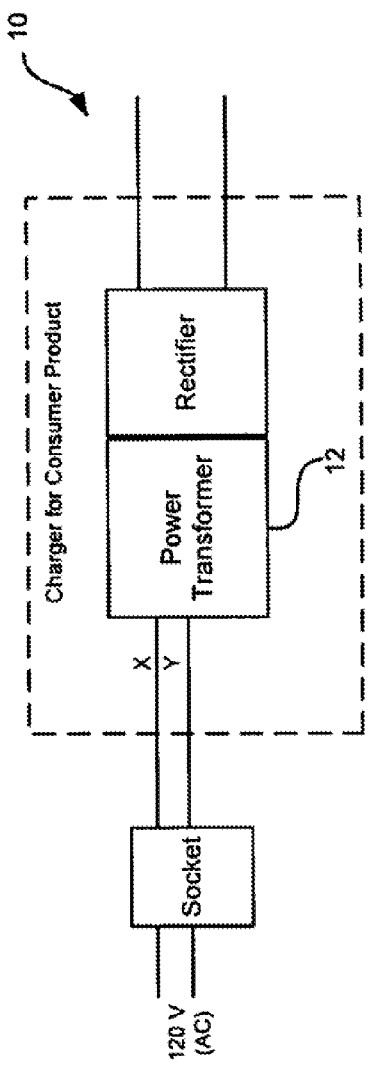

CIRCUIT AND ASSOCIATED METHOD FOR REDUCING POWER CONSUMPTION IN A POWER TRANSFORMER

FIELD OF THE INVENTION

The present invention relates to the field of power conservation. In particular, the present invention relates to a circuit and associated method for preventing unnecessary energy consumption in a power transformer of electrical and electronic devices under no-load or low-load conditions.

BACKGROUND OF THE INVENTION

Power transformers and "chargers" are used to power many office and household electronic and electrical devices. They operate by shifting incoming AC wall power to different, usually lower, voltage levels, often using a coil transformer. The coil on the input side is referred to as the primary winding and coil on the output side is referred to as the secondary winding. The secondary winding of a coil transformer is typically followed by a converter, which changes the AC transformer output into a DC signal.

When a device on the secondary side of the transformer or charger requires power, it loads the transformer/charger output. However, even when the device on the secondary side requires no power and presents no load, the transformer primary typically continues to operate. Losses such as resistive losses in the transformer primary coil will consume energy. This approach first came into use before energy conservation became a topical issue. Today these devices are referred to as "energy vampires". A second type of so-called "energy vampire" is exemplified by a relatively large transformer capable of providing relatively high peak powers, such as, for example, a microwave oven running on "High". Most of the time, however, the high power capability is not needed but the power transformer is kept continuously running to power other continuously-on functions such as a clock. While instantaneous power losses are low, significant energy consumption accrues over time.

Other forms of "energy vampires" include appliances that are kept pre-heated, such as photocopy machines. It has been estimated that "energy vampires", in their various forms and configurations, consume roughly 10% of all power generated in the United States. Reducing these losses can directly benefit consumers and power providers alike. Moreover, reducing these losses provides innumerable environmental benefits.

It is recognized that not all power supplies are transformer based. For example, switch-mode supplies operate by using a switching regulator to turn MOSFETs on and off in rapid succession to maintain a predetermined output voltage or current. While these switch mode supplies can lead to more efficient power usage than, for example, a voltage divider in a dimmer switch, they suffer from being frequently more expensive, complex and electrically noisy. Further drawbacks include being slow and/or inaccurate with rapidly changing loads; producing electrical transients that can potentially damage delicate electronics; having a poor power factor: having a reactance that results in inefficient power utilization and not providing high voltage isolation.

The present disclosure addresses at least some of these concerns.

SUMMARY

The present invention provides a circuit and method for reducing power consumption in a power transformer, typically incorporated into a consumer device. In an embodiment, a detection/isolation circuit is coupled to an input of a power transformer/rectifier via a switching device. The switching device can be, for example, a solid state relay. The detection/isolation circuit is configured to sense the occurrence of no-load conditions in the power transformer and responsively disengage the power transformer from a coupled source of power (e.g., wall outlet) via the coupled switching device.

According to one aspect of the invention, a second switching device is used to further isolate the power transformer/rectifier. In one embodiment, the second switching device is coupled to an output of the power transformer/rectifier to prevent current losses in the secondary windings of the power transformer.

One advantage provided by the circuit and method of the present disclosure is that by disengaging the power transformer in response to sensed no-load or low-load conditions, unnecessary power consumption in the power transformer is substantially reduced or eliminated.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 1a is a diagram of a conventional charger for a consumer device operating under a load condition, according to the prior art.

FIG. 1b is a diagram of the conventional charger for a consumer device of FIG. 1a operating under a no-load condition, according to the prior art.

Figure 2:
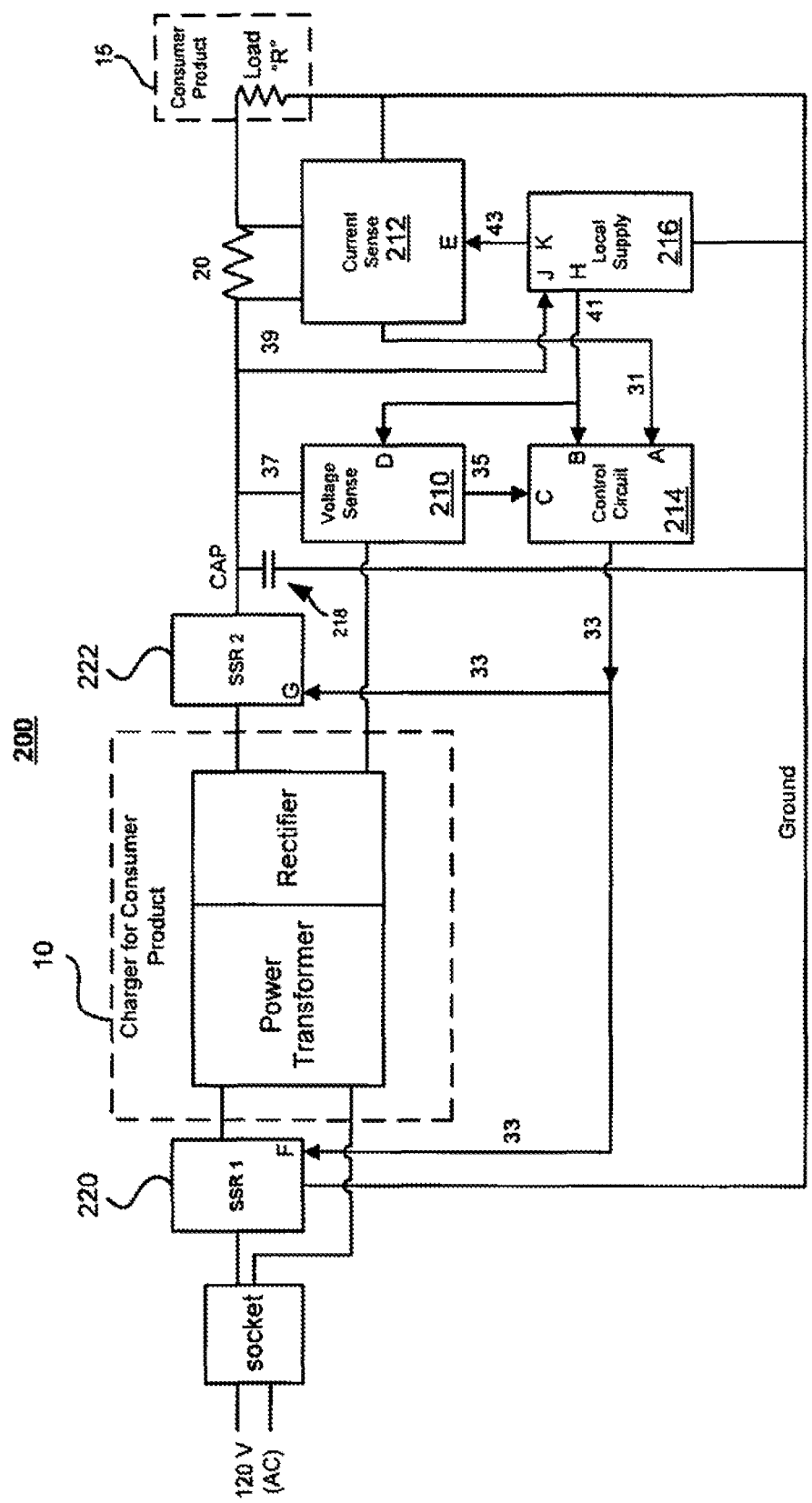
FIG. 2 is a diagram of a detection/protection circuit in accordance with the present disclosure interfaced to the conventional consumer device of FIG. 1.

It should be understood that the drawing(s) is for purposes of illustrating the concepts of the disclosure and is not necessarily the only possible configuration for illustrating the disclosure.

DETAILED DESCRIPTION OF SOME PREFERRED EMBODIMENTS

It should be understood mat the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carded out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein, Referring now to FIG. 1a, shown therein is a charger 10 for a consumer device 15 comprising a power transformer/rectifier 12. The power transformer/rectifier 12 has input terminals x, y for connecting the power transformer 12 to a power source (e.g. 120 V AC). The power transformer/rectifier 12 is shown connected to a load "R" of a consumer product 15. In use, the power transformer/rectifier 12 couples the 120 V AC source to the load "R" by either down converting or up converting the 120 V AC source.

Referring now to FIG. 1b, shown therein is the charger 10 for the consumer device 15 of FIG. 1a under a no-load condition. In this case, the power transformer/rectifier 12 continues to consume power from the 120 V AC source by virtue of remaining coupled to the source irrespective of whether or not a load is present. As discussed above, the power consumption of the power transformer/rectifier 12 serves no useful purpose and is therefore wasteful and undesirable from an energy conservation perspective.

Referring now to FIG. 2, shown therein a detection/isolation circuit 200, according to one embodiment, coupled to the charger 10 for the consumer device 15 of FIG. 1. The detection/isolation circuit 200 comprises, solid state relay (SSR) 1 220, solid state relay (SSR) 2 222, voltage sense module 210, current sense module 212, control circuit 214, local supply 216 (i.e., regulator module) and super capacitor 218.

Overview

The detection/isolation circuit 200 of the present disclosure is configured to open the two solid state relays, (SSR 1) 220 and (SSR 2) 222, to thereby isolate the power transformer/rectifier 12 upon detecting a no-load or low-load condition in the power transformer/rectifier 12 to preserve energy consumption. Low-load conditions are defined herein to be substantially in the range of less than 5 mW.

The detection/isolation circuit 200 of the present disclosure is further configured to close the two solid state relays, (SSR 1) 220 and (SSR 2) 222 upon detecting either of two conditions. The detection/isolation circuit 200 is configured to close the two solid state relays upon detecting the presence of a load, as a first condition. Second, the detection/isolation circuit 200 is further configured to close the two solid state relays to re-charge the super capacitor 218 whenever its stored voltage reaches pre-determined threshold voltage in the no-load or low-load state. A general property of such SSR devices is that in the open state, isolation is maintained between input and output. In addition isolation is also maintained between the control and the switching elements. In the preferred configuration, SSR 1 is coupled to the input of a consumer device's charger 10 and SSR 2 is coupled to the output of the consumer device's charger 10. Whenever the SSRs are open, by virtue of the charger 10 of the consumer device 15 being located therebetween, the consumer device 15 is effectively isolated from its source (at its input terminal) and load (at its output terminal). Also, by virtue of SSR 1 being open, the consumer is insulated from any hazardous line voltage.

The detailed circuit operation of detection/isolation circuit 200 for performing the circuit operations, as generally described above, are as follows.

Super-Capacitor 218

In the absence of a load (i.e., no-load condition), super capacitor 218 acts like a virtual battery that serves to power the voltage sense module 210, current sense module 212 and control circuit 214 indirectly via the local supply module 216.

Local Supply 216 (Regulator Module)

Local supply 216 receives power directly from the super capacitor 218 at input "J" over line 39 and re-distributes (regulates) the power provided to the various modules. In the embodiment illustrated in FIG. 2r power is received from the super capacitor 218 at input "J" of local supply 216 over line 39 and is re-distributed via various output ports as shown. In particular, power is re-distributed, in a regulated manner, from output "H" of local supply 216 over line 41 to the voltage sense module 210 at input "D". Power is also distributed, in a regulated manner, from output "H" of local supply 216 over line 41 to the control circuit module 214 at input "B". Power is also distributed, in a regulated manner, from output "K" of local supply 216 over line 43 to the current sense module 212 at input "E".

Voltage-Sense Module 210

The voltage sense module 210 includes a sense line 37 that continuously monitors the voltage on super capacitor 218. The voltage sense module 210 further includes internal logic that determines when the voltage on the super capacitor 218 falls below some pre-determined voltage threshold (e.g. 3 V) at which point the super capacitor 218 must be re-charged. For example, in the load state, the super capacitor 218 re-charges to some nominal voltage value (e.g., 5 V). Thereafter, in the no-load or low-load state, the super capacitor 218 slowly drains in that is serves as a source of current for each of the other modules to maintain their operation while the power transformer/rectifier 12 is disengaged from the circuit. In the no-load state, when the voltage sense module 210 senses that super capacitor 218 has reached the threshold voltage, the voltage sense module 210 outputs a "re-charge capacitor" signal on output line 35 to input "C" of the control circuit 214. In response to receiving the "re-charge capacitor" signal on line 35 at control circuit 214, control circuit 214 outputs a "relay close" signal on line 33 to inputs "F" and 'G' of (SSR 1) 220 and (SSR 2) 222, respectively, which causes both relays to close, thus initiating another charge state. This allows the super capacitor 218 to re-charge back to its nominal value. In one embodiment, the super capacitor 218 has a capacitance of 1 F and is charged to a maximum of 5 V.

Current-Sense Module 212

The current sense module 212 detects the presence of a load "R" of a consumer product 15 on the power transformer/rectifier 12. In one embodiment, sensing is performed via a sensing resistor 20. Upon detecting the presence of a load, as opposed to an open circuit, the current sense module 212 detects a voltage drop across resistor 20 and outputs a "load present" signal on line 31 to input "A" of control circuit 214. Upon receiving the "load present" signal at input "A" of control circuit 214, the control circuit 214 outputs a "relay close" signal on line 33 to inputs "F" and "G" of SSR 1 220 and SSR 2 222, respectively, which causes both relays, SSR 220, 222 to close substantially simultaneously.

Control Circuit 214

The control circuit 214, in one embodiment, operates as a state machine that turns the relays 220, 222 on and off in response to receiving activation and deactivation signals, as described above.

In some embodiments, a single SSR 220 is used. In the presently described embodiment, two relays are used, SSR 1 220 and SSR 2 222. The second relay, SSR 2 222, prevents current from leaking back into the power transformer when the input to the power transformer/rectifier 12 is disengaged via SSR 1 220.

EXAMPLE

Figure 3:
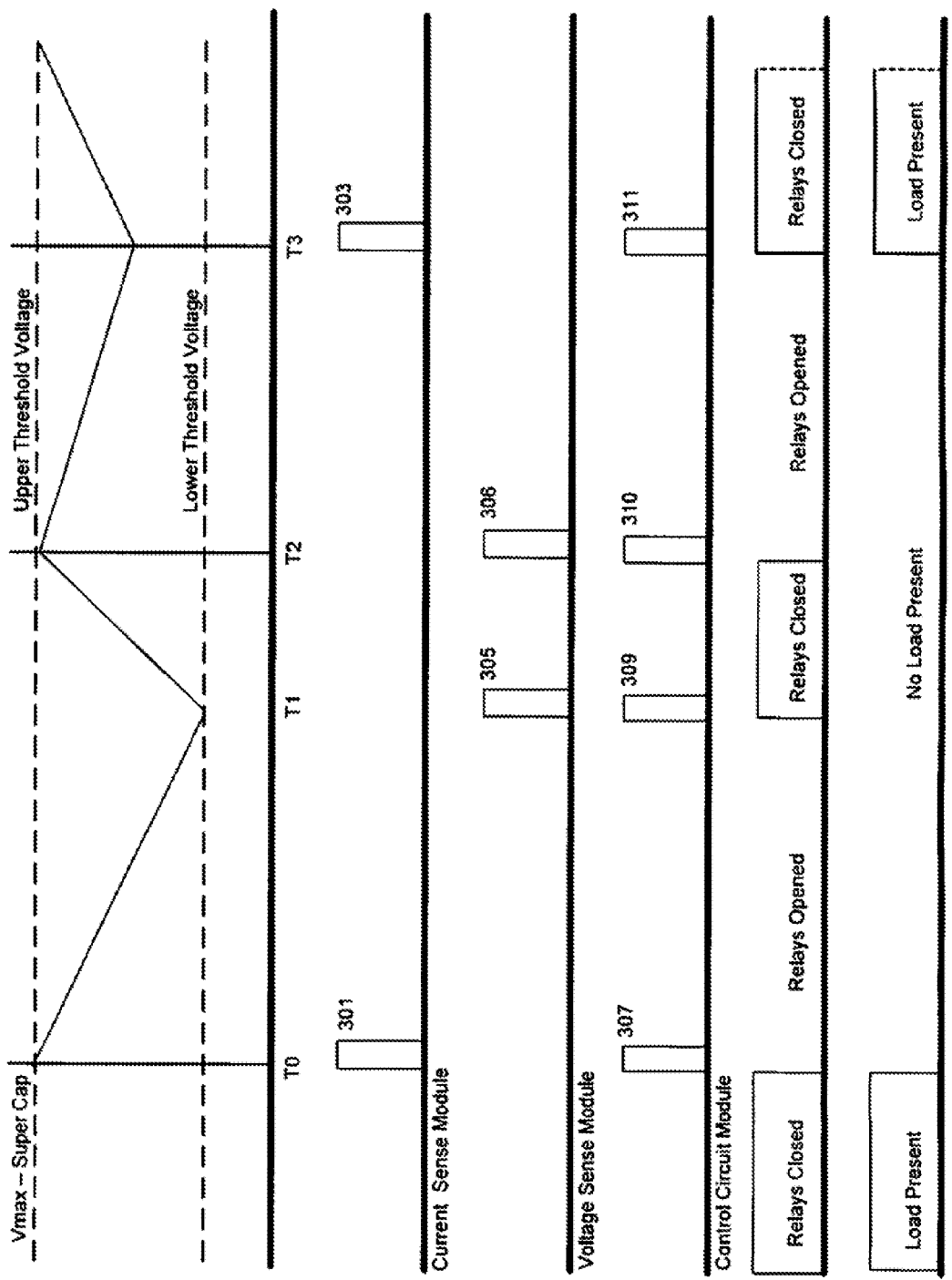
FIG. 3 is a diagram illustrating a method for reducing power consumption in a power transformer, typically incorporated into a consumer device.

With reference now to FIG. 3, there is shown, by way of example, a method for reducing power consumption in a power transformer, typically incorporated into a charger 10 of a consumer device 15.

Prior to time T0: It is assumed that the relays 220, 222 have been previously closed and that super capacitor 218 is sufficiently charged to some nominal voltage level (e.g., 5V).

At time T0: load "R" of consumer product 15 is removed, as sensed by current sense module 214, which sends an output signal 301 to the control circuit 214. Control circuit sends signal 307 to the relays 220, 222 to open.

From time T0 moving forward, the voltage on super-capacitor 218 slowly drains to maintain the other modules in an operating state while the relays 220, 222, remain open.

At time T1: The voltage on super-capacitor 218 reaches a pre-determined threshold level, V-low thresh. Voltage sense module 218 senses this condition and outputs signal 305 to the control circuit 214. The control circuit 214 sends an output signal 309, to both relays 220, 222 to close. This results in a steady rise of the voltage on super capacitor 218, towards its nominal voltage level, which is reached at time T2.

At time T2: The relays 220, 222 open again. In one embodiment, a second threshold is utilized within the voltage sense module 210 which detects that super capacitor 218 has charged to its nominal voltage. Upon detecting this state, the voltage sense module 210 outputs a "nominal voltage reached" signal 306 on output line 35 to input "C" of the control circuit 214. In response to receiving the "nominal voltage reached" signal on line 35 at control circuit 214, control circuit 214 outputs a "relay open" signal 310 on line 33 to inputs "F" and "G" of (SSR 1) 220 and (SSR 2) 222, respectively, which causes both relays to open, thus initiating another discharge state. The astute reader will recognize from the example that each successive signal supplied from control circuit 214 to inputs "F" and "G " of (SSR 1) 220 and (SSR 2) 222, respectively, causes the relays to "open, close, open, etc." in sequence. A control signal may result from a low voltage condition on the super capacitor 218, a nominal voltage being reached on super capacitor 218 or the detection of a load condition.

From time T2 going forward, the voltage on super-capacitor 218 slowly drains again to maintain the other modules in an operating state while the relays 220, 222, open once again.

At time T3: The presence of a load "R" of consumer product 15 is detected by current sense module 212. Upon detecting the presence of a load "R", the current sense module 212 outputs an output signal 303 to the control circuit 214. Control circuit 214 commands sends signal 311 to the relays 220, 222 to close.

Although embodiments which incorporate the teachings of the present disclosure have been shown and described in detail herein, those skilled in the art can readily devise many other varied embodiments that still incorporate these teachings, Having described preferred embodiments for a circuit and associated method for preventing unnecessary energy consumption in a power transformer (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims. Having thus described the disclosure with the details and particularity required by the patent laws, what is claimed and desired protected by Letters Patent is set forth in the appended claims.

We claim:

1. A circuit for reducing power consumption in a power transformer during low-load and no-load conditions, the circuit comprising:

a first solid state switching device coupled to an input of the power transformer, said first solid state switching device being configured to disengage said power transformer from a power source upon detecting said no-load and low-load conditions on said power transformer;

a second solid state switching device coupled to an output of said power transformer a rectifier coupled to an output of said power transformer, said rectifier being configured to rectify an output voltage of said power transformer;

a super capacitor coupled in parallel to an output of said rectifier, said super capacitor being configured to store energy during a load condition and further being configured to provide energy during said low-load and no-load conditions;

a voltage sense module coupled to said super capacitor and configured to monitor continuously a voltage on said super capacitor and to output a first control signal upon detecting a low voltage condition on said super capacitor;

a current sense module coupled to an output of said power transformer, said current sense module being configured to detect a load on said power transformer and to output a second control signal upon detecting said load condition, and a control circuit configured to receive said first control signal from said voltage sense module and to receive said second control signal from said current sense module and to output a close switch signal to said first and second solid state switching devices in response to receiving said first and second control signals;

wherein the voltage sense module and the current sense module receive power from the super capacitor.

2. A circuit according to claim 1, further comprising a regulator module for regulating power distributed to said voltage sense module, said current sense module and said control circuit.

3. A circuit according to claim 2, wherein the first and second solid state switching devices are solid state relays.

4. A circuit according to claim 1, wherein said first and second solid state switching devices open and close substantially simultaneously.

5. A circuit according to claim 1, wherein said detection of said low voltage condition comprises detecting a voltage on said super capacitor being substantially equal to a pre-determined threshold voltage.

6. A circuit according to claim 1, wherein said capacitor is on the order of 1 farad.

7. A circuit according to claim 1, wherein said power transformer is an element of a consumer device.

8. A circuit according to claim 1, wherein said low-load condition is less than substantially 5 mW.

9. A circuit according to claim 1, wherein said current sense module further comprises a sensing resistor for detecting a load on said power transformer.

10. A device having reduced power consumption during low-load and no-load conditions, comprising:

a rectifier configured to convert AC power to DC power;
a power transformer coupled to said rectifier;

a power reduction circuit configured to reduce power consumption during said low-load and no-load conditions, the power reduction circuit comprising:

(a) a first solid state switching device coupled to an input of the power transformer, said switching device configured to disengage said power transformer from a power source upon detecting said no-load and low-load conditions on said power transformer;

(b) second solid state switching device coupled to an output of said power transformer.

(c) a super capacitor coupled in parallel to an output of said power transformer, said a super capacitor being configured to store energy during a load condition and to provide energy during said low-load and no-load conditions;

(c) a voltage sense module coupled to said super capacitor and configured to monitor continuously a voltage on said super capacitor and to output a first control signal upon detecting a low voltage condition on said super capacitor;

(d) a current sense module coupled to an output of said power transformer, said current sense module being configured to detect a load on said power transformer and to output a second control signal upon detecting said load condition; and (e) a control circuit configured to receive said first control signal from said voltage sense module, to receive said second control signal from said current sense module, and to output a close switch signal to said switching device in response to receiving said first and second control signals;

wherein the voltage sense module and the current sense module receive power from the super capacitor.

11. A device according to claim 10, wherein the first and second solid state switching devices are solid state relays.

12. A device according to claim 10, further comprising a regulator module for regulating power distributed to said voltage sense module, said current sense module and said control circuit.

13. A device according to claim 10, wherein said detection of said low voltage condition comprises detecting a voltage on said super capacitor being substantially equal to a pre-determined threshold voltage.

14. A device according to claim 10, wherein said device is a consumer device.

* * * * *